United States Patent
Benzoni et al.

(10) Patent No.: US 8,346,097 B1
(45) Date of Patent: Jan. 1, 2013

(54) LIGHT SOURCE FOR A PASSIVE OPTICAL NETWORK

(75) Inventors: Albert M. Benzoni, South Pasadena, CA (US); Joel S. Paslaski, San Gabriel, CA (US)

(73) Assignee: HOYA Corporation USA, San Jose, CA (US)

( * ) Notice: Subject to any disclaimer, the term of this patent is extended or adjusted under 35 U.S.C. 154(b) by 249 days.

(21) Appl. No.: 12/723,857

(22) Filed: Mar. 15, 2010

Related U.S. Application Data

(60) Provisional application No. 61/164,219, filed on Mar. 27, 2009.

(51) Int. Cl.
*H04B 10/04* (2006.01)

(52) U.S. Cl. .......................... 398/195; 398/197; 398/198

(58) Field of Classification Search ............... 398/33, 398/74, 115, 116, 195–198, 192
See application file for complete search history.

(56) References Cited

U.S. PATENT DOCUMENTS

| | | | |
|---|---|---|---|
| 4,982,407 A | 1/1991 | Murase et al. | |
| 5,140,603 A | 8/1992 | Anderson et al. | |
| 5,267,071 A | 11/1993 | Little et al. | |
| 5,448,629 A | 9/1995 | Bosch et al. | |
| 5,754,577 A | 5/1998 | Casper et al. | |
| 5,793,782 A | 8/1998 | Meyerueix | |
| 6,055,278 A * | 4/2000 | Ho et al. | 375/296 |
| 6,549,316 B2 * | 4/2003 | Blauvelt | 398/119 |
| 6,917,639 B2 | 7/2005 | Ishida et al. | |
| 7,711,272 B2 * | 5/2010 | Blauvelt | 398/197 |
| 7,809,282 B2 * | 10/2010 | Zhou | 398/193 |
| 7,888,625 B2 * | 2/2011 | Holonyak et al. | 250/214 R |
| 2009/0237171 A1 * | 9/2009 | Zheng et al. | 332/151 |
| 2010/0040099 A1 | 2/2010 | Blauvelt et al. | |
| 2010/0074619 A1 | 3/2010 | Blauvelt | |

OTHER PUBLICATIONS

International Search Report and Written Opinion for PCT App No. PCT/US2006/061235.

* cited by examiner

*Primary Examiner* — Dalzid Singh
(74) *Attorney, Agent, or Firm* — David S. Alavi

(57) ABSTRACT

A method comprises: receiving an RF signal; providing an RF signal level; setting a DC optical power level at one of at least two levels depending on whether the RF signal level is above or below an RF threshold; and modulating with the RF signal optical output power about the DC optical power level. An apparatus comprises: a light source; an RF detector arranged to receive the RF signal and to provide the RF signal level; an optical power control circuit coupled to the RF detector and to the light source that includes a comparator and is arranged to set the DC optical power level according to the RF signal level; and an optical modulator coupled to the light source and arranged to receive the RF signal and to modulate therewith optical output power about the DC set point.

26 Claims, 9 Drawing Sheets

LIGHT SOURCE FOR A PASSIVE OPTICAL NETWORK

BENEFIT CLAIMS TO RELATED APPLICATIONS

This application claims benefit of U.S. provisional App. No. 61/164,219 entitled "Light source for a passive optical network" filed Mar. 27, 2009 in the names of Albert M. Benzoni and Joel S. Paslaski, said provisional application being hereby incorporated by reference as if fully set forth herein.

BACKGROUND

The field of the present invention relates to light sources. In particular, a light source for a passive optical network is disclosed herein.

This application is related to subject matter disclosed in commonly owned (i) U.S. provisional App. No. 60/739,398 entitled "Laser source for passive optical network" filed Nov. 23, 2005 in the name of Henry A. Blauvelt, (ii) U.S. non-provisional application Ser. No. 11/562,684 entitled "Laser source for a passive optical network" filed Nov. 22, 2006 in the name of Henry A. Blauvelt, and (iii) international App. No. PCT/US2006/061235 entitled "Laser source for a passive optical network" filed Nov. 23, 2006 in the name of Henry A. Blauvelt and published May 31, 2007 as WO 2007/062407. Each of said applications is hereby incorporated by reference as if fully set forth herein.

In a typical passive optical network (PON), multiple network termini 102 are connected to a single network node 104 via an optical splitter network 106 (FIG. 1). Downstream optical signals are routed from the network node 104 through the splitter network 106 and reach all of the network termini 102, regardless of the intended target terminus of the signal. Upstream signals originating at a network terminus 102 are transmitted through the splitter network 106 to the network node 104. If upstream optical signals are transmitted from two or more network termini 102 simultaneously, those signals might interfere with one another upon reaching the network node 104, or further upstream from the network node.

Upstream optical signals are typically generated at a network terminus in response to radio-frequency (RF) electrical signals carrying desired information. The upstream optical signal typically comprises some DC optical power level (also referred to as a DC optical set point), with the information carried by optical modulation about the DC optical power level set point. The modulation of the optical signal is typically driven by the corresponding RF electrical signal. The source of the optical signal is typically a semiconductor laser source (e.g., a diode laser such as a Fabry-Perot [FP] laser, a distributed Bragg reflector [DBR] laser, or a distributed feedback [DFB] laser), but any suitable coherent or incoherent optical source can be employed (e.g., a light-emitting diode [LED] or a non-semiconductor optical source).

It may be desirable to provide a light source for use in a passive optical network that reduces the likelihood or severity of interference between simultaneously transmitted upstream optical signals.

In the commonly owned applications listed above, e.g., application Ser. No. 11/582,684 (the '684 application), the likelihood of interference between simultaneously transmitted upstream optical signals is decreased (i) by substantially reducing optical power emitted by a laser source when it is not receiving any electronic modulation signal, and (ii) by limiting emitted optical power to a DC optical power level just sufficient to accommodate the modulation imposed by an electronic RF modulation signal. An exemplary laser drive and modulation circuit disclosed in the '684 application is shown in FIG. 2 and its corresponding operational behavior is illustrated schematically in FIG. 3.

In FIG. 2, an incoming RF electrical signal 430 is split by RF tap 412. A fraction of the RF signal 430 reaches RF detector 410, which is operatively coupled to laser power control circuit 408. A laser current control 402b comprises any suitable circuit for controlling laser drive current through laser diode 402a (the circuit 402b shown in FIG. 2 is exemplary only) and is arranged to provide a DC laser power level that varies approximately linearly with an applied control voltage $V_{control}$ that is provided by the laser power control circuit 408. The remaining fraction of the RF signal 430 is coupled in any suitable way directly to laser diode 402a for modulating the laser output power, in this example through an impedance-matching component or network 411 and a capacitor network C1 and C2 in these examples. The total laser diode current is the sum of the DC current controlled by laser current control 402b and the RF signal applied to the laser diode 402a. The direct coupling of the RF signal to the laser diode comprises the modulator or modulating means in the exemplary embodiments; any other suitable modulator or modulating means can be employed. RF detector 410 produces a detector voltage $V_{RF}$ approximately proportional to the detected RF signal level, which can be detected RF signal amplitude or detected RF signal power. The impedance-matching component or network 411 typically is employed for matching the low impedance of the laser diode 402a to the impedance characteristics of the RF electrical signal transmission system that transmits RF signal 430 (e.g., 75 ohms for a typical coaxial cable system). Component or network 411 can comprise one or more resistors, one or more transformers, or any other suitable component or network for achieving the desired impedance-matching functionality; no specific configuration for network 411 is disclosed in the '684 application.

Laser current control 402b in this exemplary embodiment comprises a bias control circuit that varies the DC laser drive current allowed to flow through the laser diode 402a. The laser diode 402a is forward-biased by laser bias voltage $V_{laser}$. The DC current allowed to flow through the laser diode 402a varies according to $V_{control}$ and a monitor voltage $V_{mon}$ produced by monitor photodiode 416 (which receives a portion of the laser output power 420 and is reverse-biased by $V_{PD}$ in this example). $V_{control}$ serves as the DC set point control voltage, and the circuit 402b acts to maintain the laser output power (as reflected by $V_{mon}$) at the laser power DC set point. The embodiment of laser current control 402b is only one example of myriad circuits or components that can be employed within the scope of the present disclosure for controlling the DC laser output power.

The exemplary configuration shown in FIG. 2 for power control circuit 408 exhibits a dependence of a laser control voltage $V_{control}$ (and hence the laser power DC set point) on the RF detector voltage $V_{RF}$ substantially as shown in FIG. 3. When $V_{RF}$ from RF detector 410 is below a selected RF threshold voltage $V_{thr}$, the power control circuit 408 supplies a low-level control voltage to the laser current control 402b. This low-level voltage results in a low-power idle level for the output of the laser diode 402a. Diode D1 causes the laser control voltage $V_{control}$ to abruptly increase to the turn-on voltage of diode D1 as $V_{RF}$ increases through $V_{thr}$. When $V_{RF}$ exceeds the selected threshold voltage $V_{thr}$, the voltage supplied by the power control circuit 408 to the laser current control 402b varies substantially linearly with the RF detector voltage $V_{RF}$ over a selected range of $V_{RF}$ from about $V_{thr}$ to a saturation input voltage $V_{RF-S}$. At the saturated input voltage, the corresponding saturated control voltage is $V_{control-S}$. The slope of the linear portion of the dependence of $V_{control}$ on $V_{RF}$ typically is substantially determined as known in the art by the operating characteristics of amplifier A1 (typically comprising one or more operational amplifiers with suitable feedback circuitry or components) and the values of one or more of the resistors R1-R5 (and may also depend on other circuit elements not shown in FIG. 2). A desired slope can be obtained by suitable adjustment of any one or more of those components. The saturation voltages typically are also determined in part by those components and can also depend on a supply voltage used to power the power control circuit 408.

The power control circuit can be operated so that when little or no RF signal is present at the RF detector 410, the laser output power is kept at a low level or turned off. When implemented at multiple network termini, this reduces the overall amount of laser power propagating upstream through the splitter network of the passive optical network, thereby reducing the likelihood or the severity of interference between upstream optical signals originating from different network termini. The power control circuit 408 can be arranged for turning off the laser when no RF signal is present or when the RF signal is below a selected threshold signal level (e.g., by reducing laser diode current below the lasing threshold). Alternatively, it may be desirable for the laser to remain above the lasing threshold but at a reduced idle power when the RF signal is absent or below the threshold signal level, e.g., so that the turn-on time for the laser or its controller might be shorter when an RF signal does appear. The threshold voltage $V_{thr}$ can be selected so that the laser remains at its low-level idle power in the presence of stray sources of RF interference, but rises to a higher transmitting laser power DC set point when an RF electrical signal exceeding the RF threshold signal level reaches the RF detector. Depending on necessary or desirable performance characteristics for the laser power control circuit 408, $V_{thr}$ can be set approximately at zero, or can be set at any suitable non-zero value.

The laser power DC set point should be sufficiently large so that modulations thereof by the RF signal are not clipped or otherwise distorted. It may also be desirable, however, to limit overall laser output power so as to reduce the likelihood or severity of interference between independent upstream optical signals in a passive optical network. This is achieved in the example of FIG. 2 by increasing the laser power DC set point monotonically with respect to an increasing detected RF signal level. Substantially linear or substantially proportional variation of the laser power DC set point with respect to the detected RF amplitude or power can be employed, for example, when the detected RF signal level exceeds a selected RF threshold signal level. In the exemplary power control circuit 408 shown in FIG. 2, $V_{control}$ varies substantially linearly with $V_{RF}$ over the selected operational range from about $V_{thr}$ to about $V_{RF-S}$. A desired slope may be selected by suitable choice of amplifier A1 (or its components) and one or more of the resistors R1-R5 to limit the overall transmitted optical power to only enough to ensure that the laser power DC set point is sufficiently high for a given RF modulation level.

Other types of optical sources can be employed, and other types of modulation of the optical source can be employed. Other circuit types or circuit configurations can be employed for providing the functionality of power control circuit 408 or laser current control 402b. Any suitable substantially monotonic dependence of the DC optical output power level versus the detected RF signal level may be employed, including substantially proportional variation, substantially linear variation, or other substantially monotonic variations.

While reducing the likelihood or severity of interference between simultaneously transmitted upstream optical signals in a passive optical network, the exemplary embodiment disclosed in the '684 application and shown in FIGS. 2 and 3 can exhibit certain performance characteristics that are undesirable in some circumstances. For example, in the low-RF state one or more components (e.g., an operational amplifier) of the amplifier A1 in FIG. 2 can be driven to a power supply rail voltage. When an RF modulation signal then appears at RF detector 410, there is often a significant lag time (often on the order of several microseconds) before the amplifier A1 responds with a laser control voltage that tracks the detected RF power. In some telecommunications applications, that lag time is unacceptably long and can result in lost data or a disrupted telecommunication link. In another example, RF signal leakage through RF detector 410 and laser power control circuit 408 into laser current control 402b can introduce distortion into the RF-modulated optical signal produced by laser diode 402a.

It may be desirable to provide a light source for use in a passive optical network (i) that reduces the likelihood or severity of interference between simultaneously transmitted upstream optical signals, (ii) that reduces lag time between appearance of an RF modulation signal and response of an optical power control circuit (sub-microsecond response times may be desirable), (iii) that reduces or eliminates RF distortion of an RF-modulated optical signal arising from RF leakage through an RF detector and an optical power control circuit, or (iv) that reduces or eliminates leakage of transient electrical signals from an optical power control circuit or current control into an RF detector or into an RF source or transmission system.

SUMMARY

A method can comprise: (a) receiving an RF electrical input signal; (b) providing a detected RF signal level; (c) setting a DC optical power level; and (d) modulating with a second fraction of the RF electrical input signal output power of a light source about the DC optical power level. The detected RF signal level corresponds to a detected first fraction of the RF electrical input signal. The DC optical power level is set at a first selected DC optical power level when the detected RF signal level is below a first selected RF threshold level, and set at a second selected DC optical power level when the detected RF signal is above the first selected RF threshold level. The second selected DC optical power level is larger than the first selected DC optical power level.

An optical apparatus can comprise: (a) a light source; (b) an RF detector; (c) an optical power control circuit; and (d) an optical modulator. The RF detector is arranged to receive a first fraction of an RF electrical input signal and to provide a corresponding detected RF signal level. The optical power control circuit is operatively coupled to the RF detector and to the light source. It is arranged to set a DC optical power level (i) at a first selected DC optical power level when the detected RF signal level is below a first selected RF threshold level and (ii) at a second selected DC optical power level when the detected RF signal is above the first selected RF threshold level. The second selected DC optical power level is larger than the first selected DC optical power level. The optical modulator is operatively coupled to the light source and is arranged to receive a second fraction of the RF electrical input signal and to modulate, with the second fraction of the RF signal, the output of the light source about the DC optical power level.

Another optical apparatus can comprise: (a) a light source comprising a diode and a diode current control; (b) an RF detector; (c) an optical power control circuit; and (d) an optical modulator. The RF detector is arranged to receive a first fraction of an RF electrical input signal and to provide a corresponding detected RF signal level. The optical power control circuit is operatively coupled to the RF detector and to the diode current control. It is arranged to set a DC optical power level that varies according to the detected RF signal level. The optical modulator comprises an electrical network arranged and connected to couple a second fraction of the RF electrical input signal to the diode to modulate optical output of the diode about the DC optical power level. The electrical network (i) provides impedance matching between the diode and a source of the RF electrical input signal, (ii) comprises a transimpedance amplifier coupled to a voltage-controlled current source, and (iii) substantially prevents reverse transmission of RF or transient electrical signals from the diode current control to the RF detector or the RF electrical input signal source.

Objects and advantages pertaining to light sources suitable for use in a passive optical network may become apparent upon referring to the exemplary embodiments illustrated in the drawings and disclosed in the following written description and/or claims.

The embodiments shown in the Figures are exemplary, and should not be construed as limiting the scope of the present disclosure and/or appended claims.

DETAILED DESCRIPTION OF EMBODIMENTS

Figure 4:
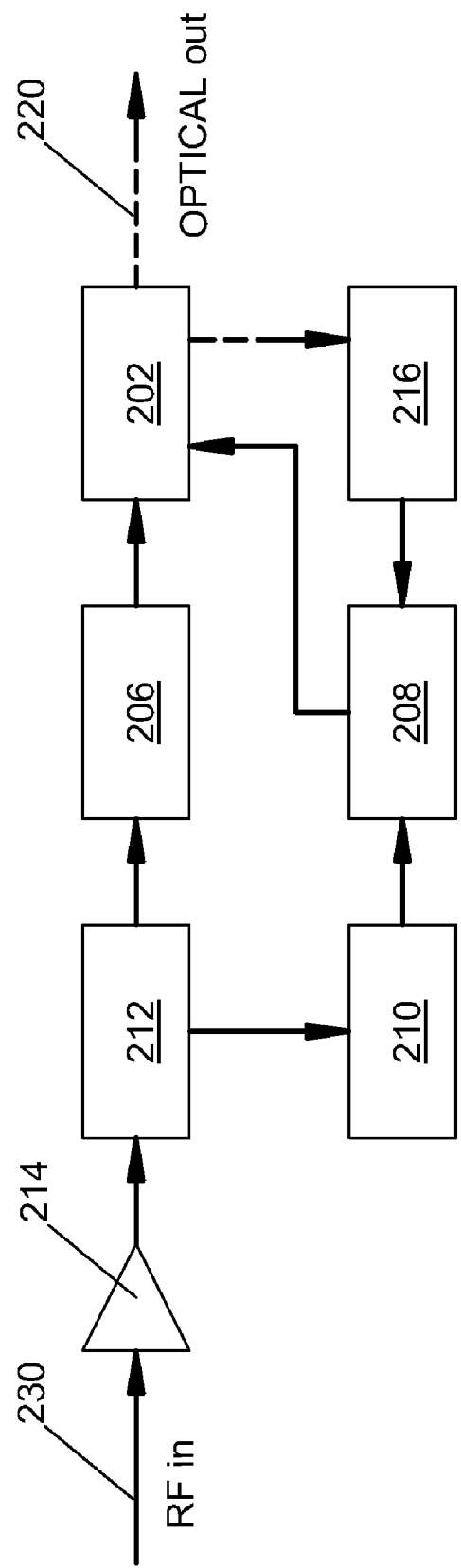
FIG. 4 is a schematic block diagram of an exemplary light source.

An exemplary embodiment of a light source is illustrated schematically in the block diagram of FIG. 4. A light source 202 is operatively coupled to an optical power control circuit 208 and optical modulator 206. Light source 202 may be of any suitable type or configuration; in many instances involving optical networks, light source 202 comprises a laser diode (LD) or a light-emitting diode (LED) and can further comprise a diode current supply or control of any suitable type or configuration. The optical power control circuit 208 may be of any suitable type or configuration. Optical modulator 206 is connected and arranged for receiving an incoming RF electrical input signal 230 (or a fraction thereof) and modulating the optical output 220 of light source 202 in response to the RF input signal. Modulator 206 can comprise: an electrical connection, network, or circuitry coupling the RF signal to the light source; an electro-absorption modulator; an electro-optic modulator; an acousto-optic modulator; or any other suitable intra-cavity or extra-cavity modulator. In some instances the optical power control circuit 208 and the modulating means 206 can comprise portions of a common circuit; in other instances the optical power control circuit 208 and modulating means 206 can comprise discrete circuits or subcomponents. An RF amplifier 214 of any suitable type may be employed for amplifying the incoming RF signal 230, if needed or desired. The modulated optical output 220 of light source 202 typically comprises modulations of the optical output power about a DC optical power level. A monitor photodetector 216 may be employed, if needed or desired, for maintaining a desired DC optical power level. The monitor photodetector 216, if present, may be of any suitable type or configuration, and may be operatively coupled to the light source 202 or to optical power control circuit 208 in any suitable way.

The incoming RF electrical signal can typically comprise one or more RF carrier bands each suitably modulated to carry a corresponding analog or digital signal stream; however, any RF electrical signal can be employed to modulate the optical output of light source 202. A fraction of the incoming electrical RF signal 230 is split off by RF tap 212 and routed to an RF detector 210 operatively coupled to optical power control circuit 208. RF detector 210 may be of any suitable type or configuration, and can include temperature compensation if needed or desired. RF tap 212 may be of any suitable type or configuration, including a directional-coupler-type splitter, a resistive tap, or any other suitable tap or splitter. Optical power control circuit 208 (or other power control means) is arranged to set a DC optical power level (i) at a first selected DC optical power level when the detected RF signal level is below a first selected RF threshold level and (ii) at a second, larger selected DC optical power level when the detected RF signal is above the first selected RF threshold level. The detected RF signal level can be either detected RF signal amplitude or detected RF signal power. These functions can be achieved by any suitable combination of digital and/or analog circuitry. Specific examples are illustrated schematically in FIGS. 5 and 6; it should be noted that myriad other circuits may be employed for achieving desired functionality of modulating means 206, power control circuit 208, and light source 202 and any light source control or supply, while remaining within the scope of the present disclosure or appended claims.

Figure 5:
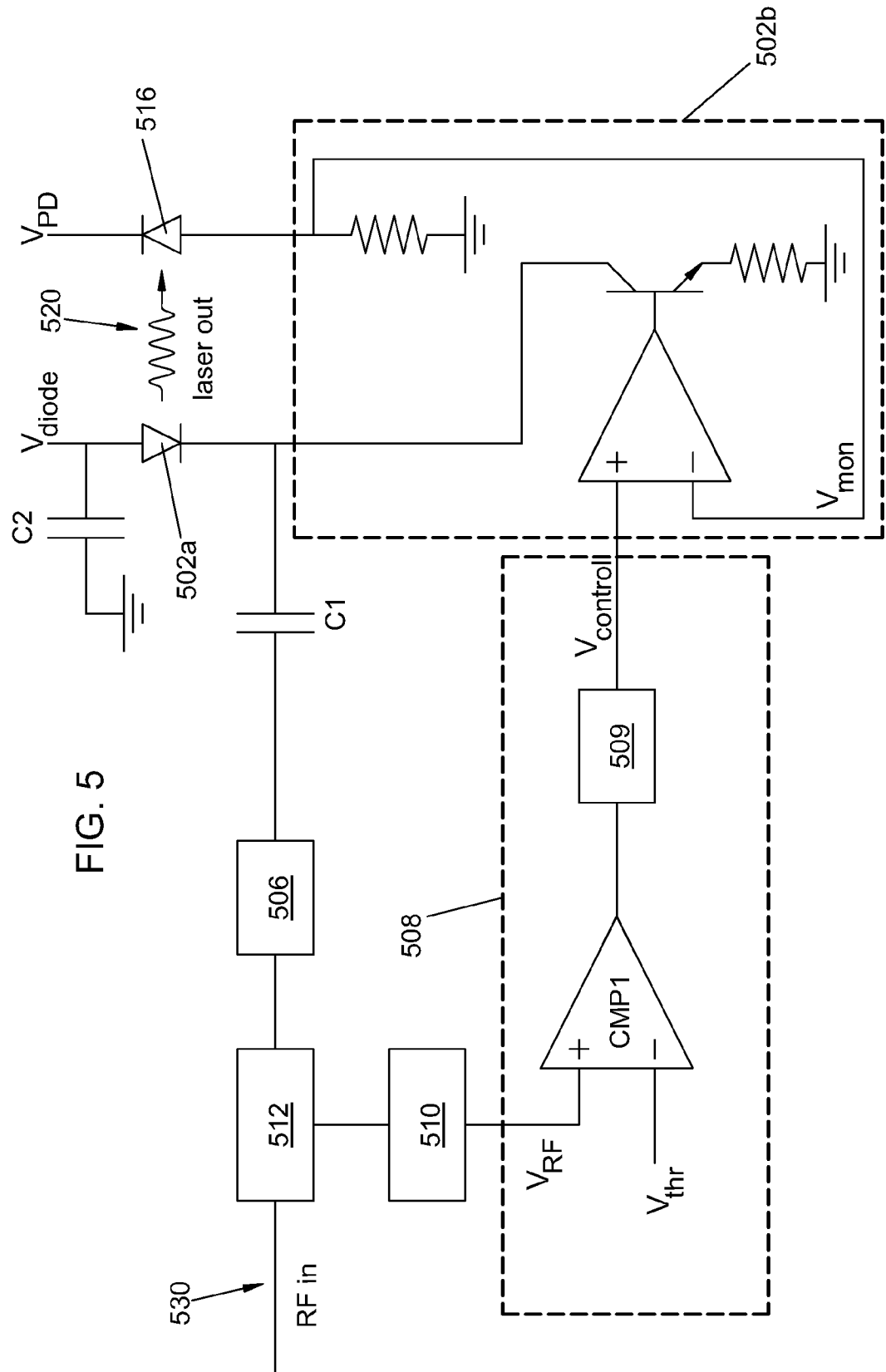
FIG. 5 is a schematic diagram of an exemplary circuit for controlling a light source.
Figure 6:
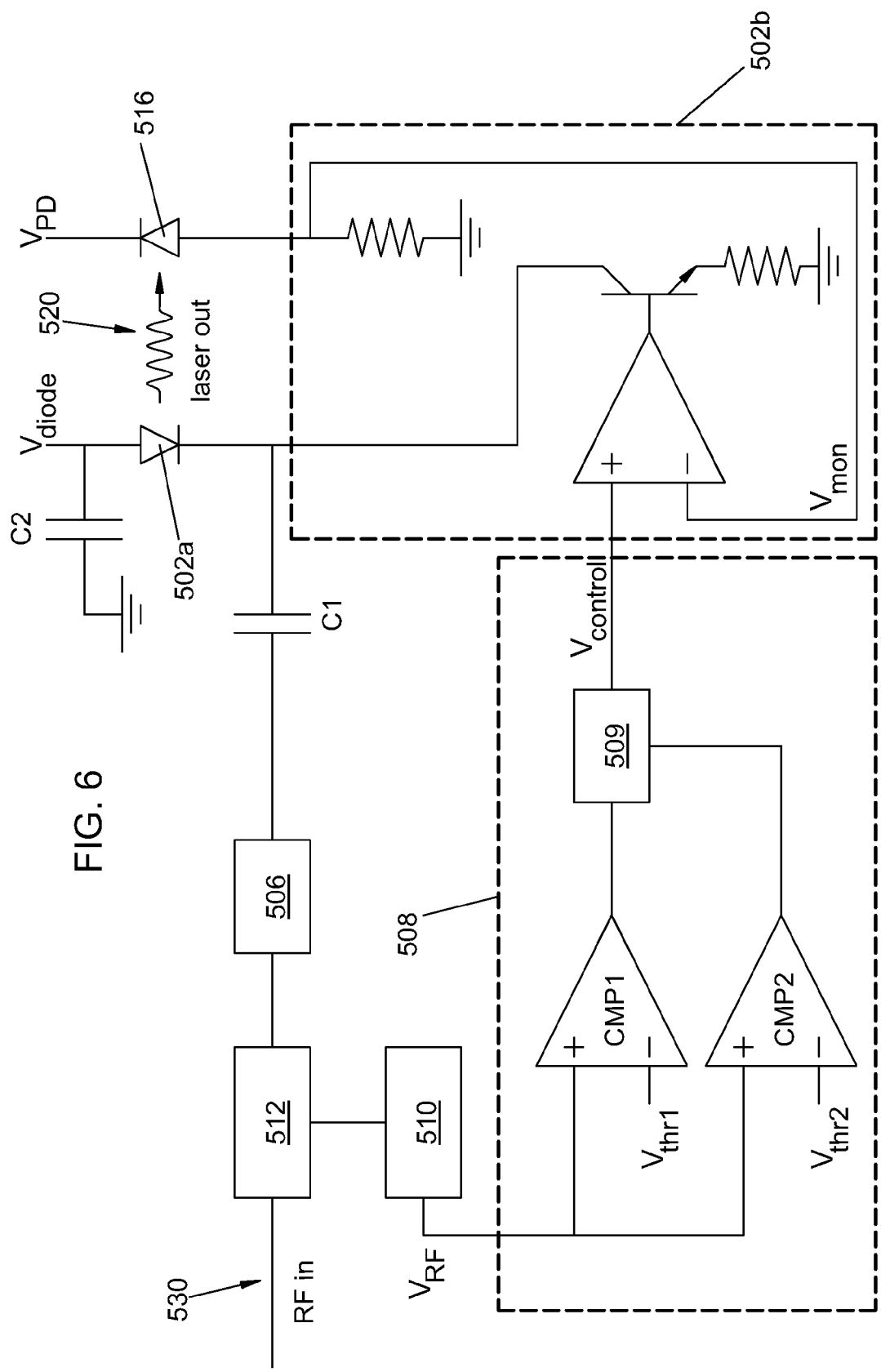
FIG. 6 is a schematic diagram of another exemplary circuit for controlling a light source.

In the exemplary light sources shown in FIGS. 5 and 6, an incoming RF signal 530 is split by RF tap 512. A first fraction of the RF signal 530 reaches RF detector 510, which is operatively coupled to optical power control circuit 508. RF detector 510 produces a detector voltage $V_{RF}$ approximately proportional to the detected RF signal level, which can be detected RF signal amplitude or detected RF signal power. In these examples, the light source comprises diode 502a (e.g., a laser diode or light-emitting diode) and a diode current control 502b comprising any suitable circuit for controlling a diode drive current through diode 502a. The circuit 502b shown in the Figures is exemplary only, and is arranged to cause diode 502a to produce a DC optical power level that typically varies approximately linearly with an applied control voltage $V_{control}$ (that is provided by the optical power control circuit 508). The remaining fraction of the RF signal 530 is coupled to diode 502a, through an impedance-matching or gain component or network 506 (and a capacitor network C1 and C2 in these examples), to modulate the diode optical output power. The total diode current is the sum of the (nominally) DC current controlled by diode current control 502b and the RF signal applied to the diode 502a through network 506. The coupling of the RF signal to the diode comprises the modulator or modulating means in the exemplary embodiments; any other suitable modulator or modulating means can be employed. The impedance-matching or gain component or network 506 typically is employed for matching the low impedance of the diode 502a to the impedance characteristics of the RF electrical signal transmission system that transmits RF signal 530 (e.g., 75 ohms for a typical coaxial cable system), or for providing an RF signal amplitude suitable for modulating the diode current. Component or network 506 can comprise one or more resistors, one or more transformers, one or more amplifiers or gain stages, or any other suitable components or network for achieving the desired impedance-matching or amplification functionality (see below).

Diode current control 502b in these embodiments comprises a bias control circuit that varies the (nominally) DC diode drive current flowing through the diode 502a. The diode 502a is forward-biased by diode bias voltage $V_{diode}$. The (nominally) DC current allowed to flow through the diode 502a varies according to $V_{control}$ and a monitor voltage $V_{mon}$ produced by monitor photodiode 516 (which receives a portion of the optical output power 520 and is reverse-biased by $V_{PD}$ in this example). $V_{control}$ serves as the DC set point control voltage, and the circuit 502b acts to maintain the diode optical output power (as reflected by $V_{mon}$) at a corresponding DC optical output power level. The exemplary embodiment of diode current control 502b shown in FIGS. 5 and 6 is only one example of myriad circuits or components that can be employed within the scope of the present disclosure for controlling the DC optical output power level.

The configuration shown in FIG. 5 for power control circuit 508 includes a comparator CMP1 and additional components, network, or circuitry 509. Comparator CMP1 can comprise a single, discrete integrated circuit or can comprise a suitably arranged assembly of components (e.g., one or more operational amplifiers, transistors, or other active or passive components), and is configured to compare the RF detector voltage $V_{RF}$ to a selected threshold voltage $V_{thr}$. If $V_{RF} < V_{thr}$ (i.e., if the detected RF signal level is below a selected RF threshold level), then optical power control circuit 508 provides voltage $V_{control-0}$ that results in a first selected DC optical power level from diode 502a. If $V_{RF} > V_{thr}$ (i.e., if the detected RF signal level is above a selected RF threshold level), then optical power control circuit 508 provides voltage $V_{control-1}$ that results in a second selected DC optical power level. The diode control voltage $V_{control}$ arises from the output voltage levels of comparator CMP1 modified by the components or network 509 to provide a corresponding control voltage levels appropriate for diode current control 502b. Any suitable components or networks thereof can be employed, including passive or active components (e.g., resistors, capacitors, transformers, diodes, transistors, or amplifiers). In practice, comparator CMP1 exhibits hysteresis, so that a transition between its lower and upper output states occurs at a slightly higher voltage near $V_{thr}$ when $V_{RF}$ increases than when $V_{RF}$ decreases (see FIG. 7). The actual voltages (near $V_{thr}$) at which the transitions occur can be arranged in any suitable way about $V_{thr}$. Hysteresis exhibited by comparator CMP1 typically results in more stable operation of optical power control circuit 508.

When $V_{RF}$ from RF detector 510 is below the selected RF threshold voltage $V_{thr}$, the optical power control circuit 508 supplies a low-level control voltage $V_{control-0}$ to the diode current control 502b. This low-level voltage can result in a low-power idle level for the output of the diode 502a (i.e., the first selected DC optical power level). Alternatively, first selected DC optical power level can be zero, with the diode current set to zero (or perhaps to some sub-threshold, non-zero level if diode 502a is a laser diode). When $V_{RF}$ from RF detector 510 is above the selected RF threshold voltage $V_{thr}$, the power control circuit 508 supplies a high-level control voltage $V_{control-1}$ to the diode current control 502b. This high-level voltage results in an operating power level for the output of the diode 502a (i.e., the second selected DC optical power level).

The optical power control circuit can be operated so that when little or no RF signal is present at the RF detector 510, the optical output power is kept at a low level or turned off. When implemented for multiple light sources at multiple corresponding network termini, this reduces the total average optical power propagating upstream through the splitter network of the passive optical network from those multiple light sources, thereby reducing the likelihood or the severity of interference between upstream optical signals originating from different network termini. The optical power control circuit 508 can be arranged for turning off the light source when no RF signal is present or when the RF signal is below a selected threshold signal level (e.g., by reducing the diode current to zero). Alternatively, it may be desirable for a laser diode to remain above its lasing threshold but at a reduced idle power when the RF signal is absent or below the threshold signal level, e.g., so that the turn-on time for the laser diode or its controller might be shorter when an RF signal does appear. Whatever type of light source is employed, the threshold voltage $V_{thr}$ can be selected so that the light source remains at its low-level idle power or zero power in the presence of stray sources of RF noise, but rises to a higher transmitting DC optical power level when an RF electrical signal exceeding the RF threshold signal level reaches the RF detector. Depending on necessary or desirable performance characteristics for the optical power control circuit 508, $V_{thr}$ can be set approximately at zero, or can be set at any suitable non-zero value.

The transmitting DC optical power level (i.e., the second selected DC optical power level) should be sufficiently large so that modulations thereof by the RF signal are not clipped or otherwise distorted. A suitable DC optical power level can be selected based on the range of expected RF signal amplitudes. The transmitting DC optical power level can be made large enough so that no RF modulation level typically encountered during normal operation is clipped or distorted and to provide sufficient optical power for detection at a network node. Alternatively, the transmitting DC optical power level can be made only large enough to reduce the probability of such clipping or distortion to an operationally acceptable level while still enabling detection at the network node. In either case the clipping or distortion can be regarded as "substantially avoided."

It may also be desirable to further reduce overall optical output power during transmission (under certain conditions) so as to reduce the likelihood or severity of interference between independent upstream optical signals in the passive optical network. This can be achieved by providing one or more additional DC optical power levels to be used when an RF-modulated, upstream optical signal is transmitted. The behavior of the DC optical power level as a function of RF signal level for the exemplary configuration of FIG. 5 is illustrated schematically in FIG. 7, and exhibits a single step from the low-level control voltage $V_{control-0}$ to a higher-level control voltage $V_{control-1}$ as $V_{RF}$ passes through $V_{thr}$. In this single-step example, transmitted optical power is reduced (or eliminated) when the RF signal falls below a threshold level, and is increased to an operational level when the RF signal exceeds the threshold. In the exemplary configuration of FIG. 6, two threshold voltages ($V_{thr1}$ and $V_{thr2}$) are employed and compared to $V_{RF}$. A schematic plot of $V_{control}$ versus $V_{RF}$ for the arrangement of FIG. 6 is shown in FIG. 8, and exhibits two steps in the control voltage $V_{control}$ as $V_{RF}$ passes through $V_{thr1}$ and then $V_{thr2}$. Hysteresis arising from the comparators CMP1 and CMP2 is evident in the schematic plots of FIG. 8.

As shown in FIG. 8, the lowest control voltage level $V_{control-0}$ occurs when $V_{RF} < V_{thr1}$, resulting in reduced optical power (or no optical power) when there is little or no RF electrical signal. An intermediate control voltage level $V_{control-1}$ occurs when the RF signal exceeds a first RF threshold level but is less than a second, higher RF threshold level (i.e., when $V_{thr1} < V_{RF} < V_{thr2}$). That control voltage $V_{control-1}$ results in an intermediate DC optical power level that is large enough to substantially avoid clipping or distortion of the RF modulation of the optical output by the corresponding intermediate RF signal level. A control voltage level $V_{control-2}$ occurs when the RF signal exceeds the second RF threshold level (i.e., when $V_{RF} > V_{thr2}$). That control voltage $V_{control-2}$ results in a higher DC optical power level that is large enough to substantially avoid clipping or distortion of the RF modulation of the optical output by the corresponding higher RF signal level. Instead of always emitting at the higher DC optical power level whenever an RF modulation signal is present, the arrangement of FIG. 6 enables optical emission at a lower, intermediate DC optical power level (but still detectable at the network node) when a lower RF modulation signal level is present, further lowering the average total optical power propagating in the passive optical network relative to the arrangement of FIG. 5. Any suitable or desired number of additional intermediate RF threshold voltages and corresponding additional control voltage levels can be employed in a stepwise fashion to provide intermediate DC optical power levels commensurate with corresponding intermediate RF signal levels.

The exemplary power control circuit 508 of FIG. 6 comprises a pair of comparators CMP1 and CMP2 arranged and connected to compare $V_{RF}$ to $V_{thr1}$ and $V_{thr2}$, respectively. The output voltages of the comparators CMP1 and CMP2 are suitably combined and modified by components or network 509 to yield corresponding control voltage levels appropriate for diode current control 502b. Any suitable components or networks thereof can be employed, including passive or active components (e.g., resistors, capacitors, transformers, diodes, transistors, or amplifiers). To provide additional intermediate control voltage levels, additional comparators can be employed.

In any of the exemplary embodiments, the threshold voltages applied (equivalently, the corresponding RF signal level thresholds) can be selected to yield any suitable or desired operating characteristics of the RF-modulated light source or its control circuit. Those voltages can be selected once and "hard-wired" into the optical power control circuit, or can be made adjustable operating parameters of the diode control circuit and repeatedly adjusted as needed or desired. Similarly, the diode control voltages applied (equivalently, the corresponding DC optical power levels) can be selected to yield any suitable or desirable operating characteristics for the RF-modulated diode light source or its control circuit, and can be "hard-wired" or adjustable as described above.

Figure 1:
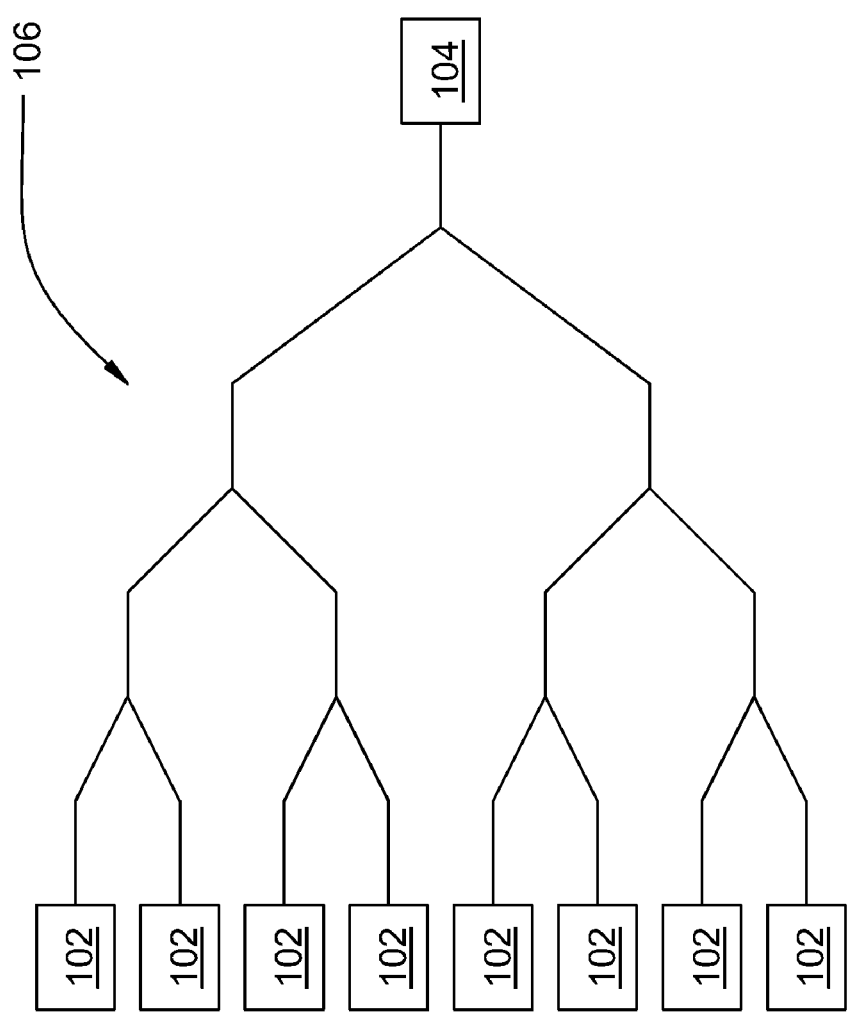
FIG. 1 illustrates schematically a passive optical network including a splitter network.
Figure 2:
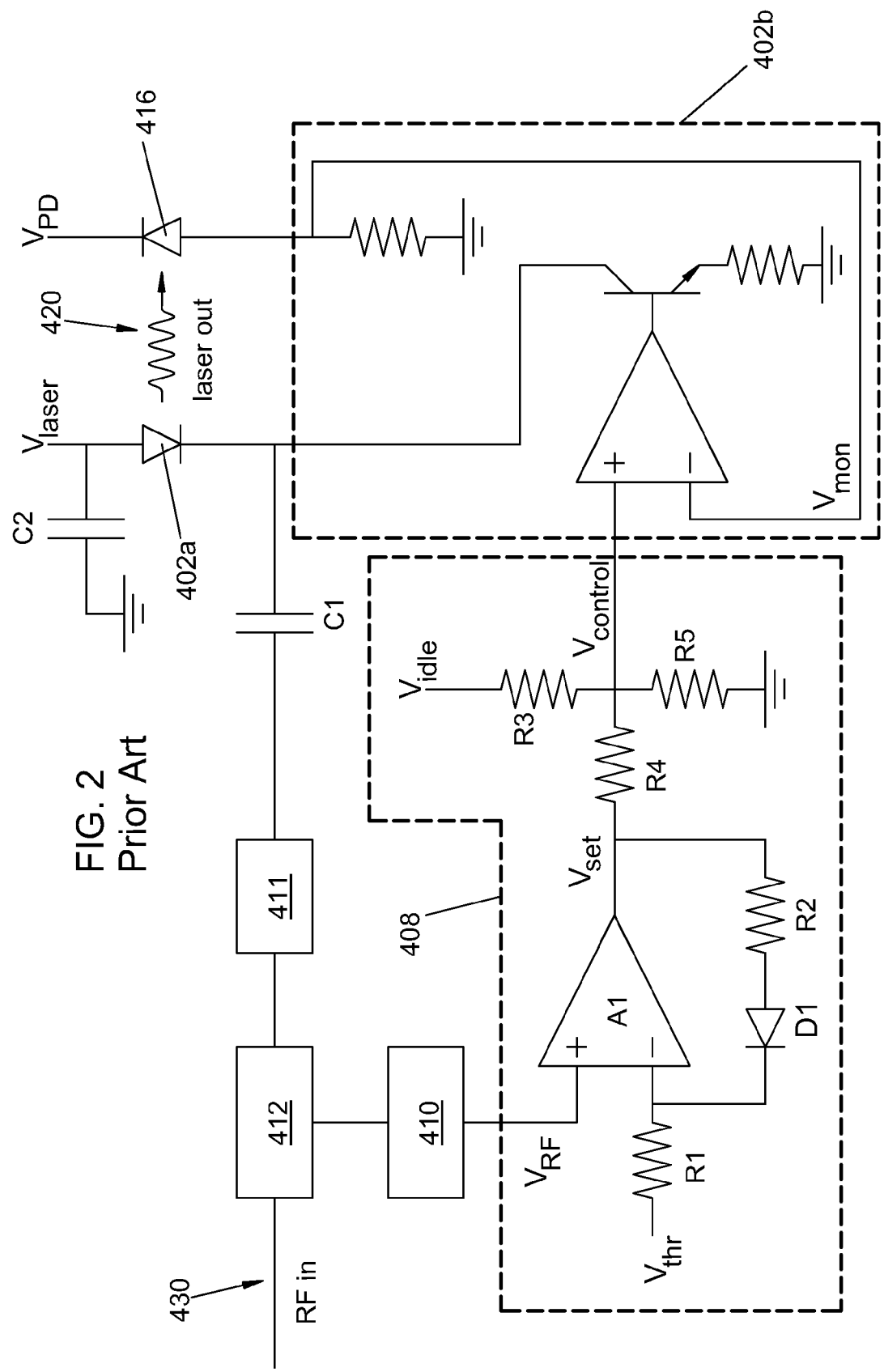
FIG. 2 is a schematic diagram of a prior exemplary circuit for controlling a light source.
Figure 3:
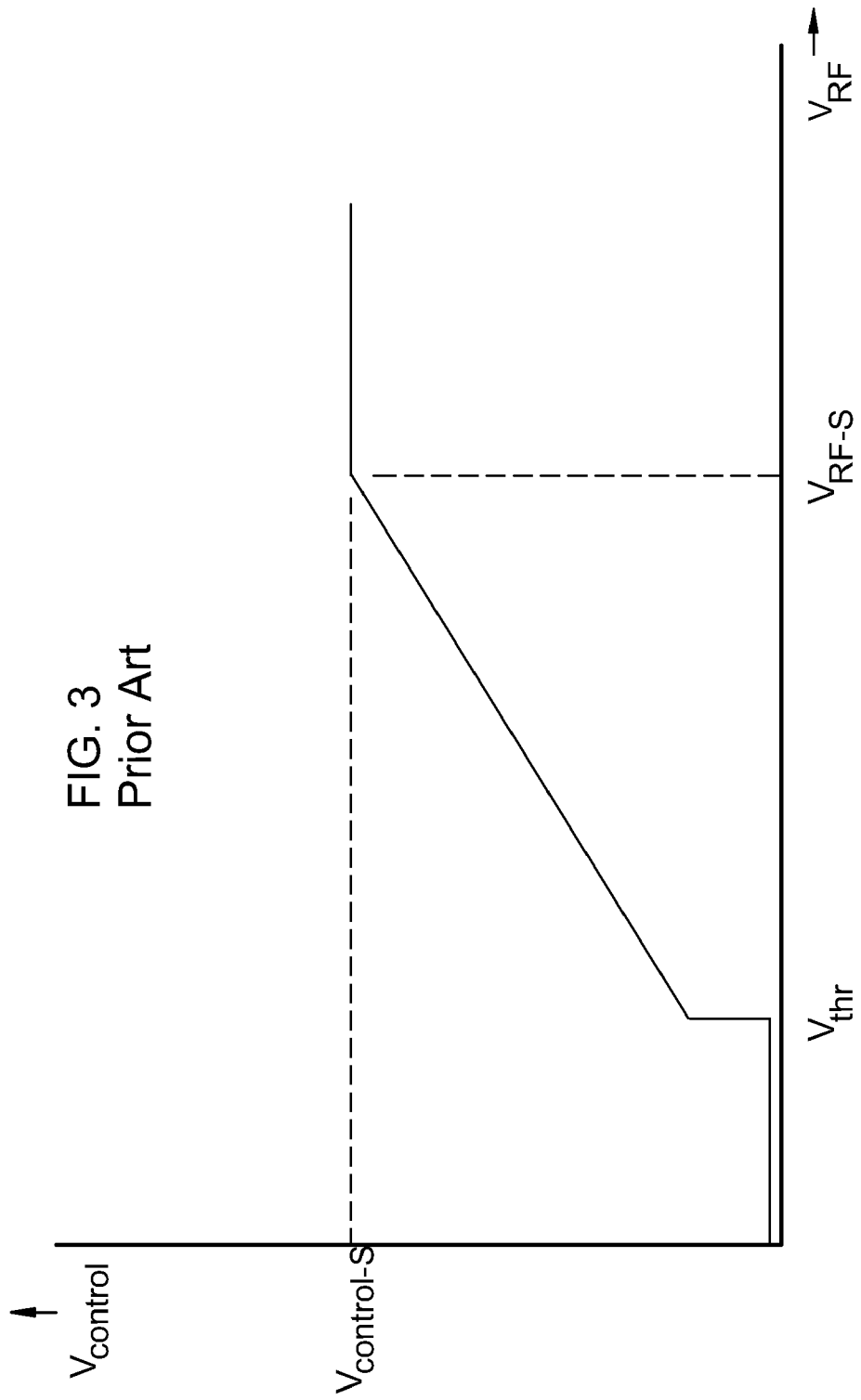
FIG. 3 is a schematic plot of light source control voltage versus RF detector voltage for the exemplary circuit of FIG. 2.
Figure 7:
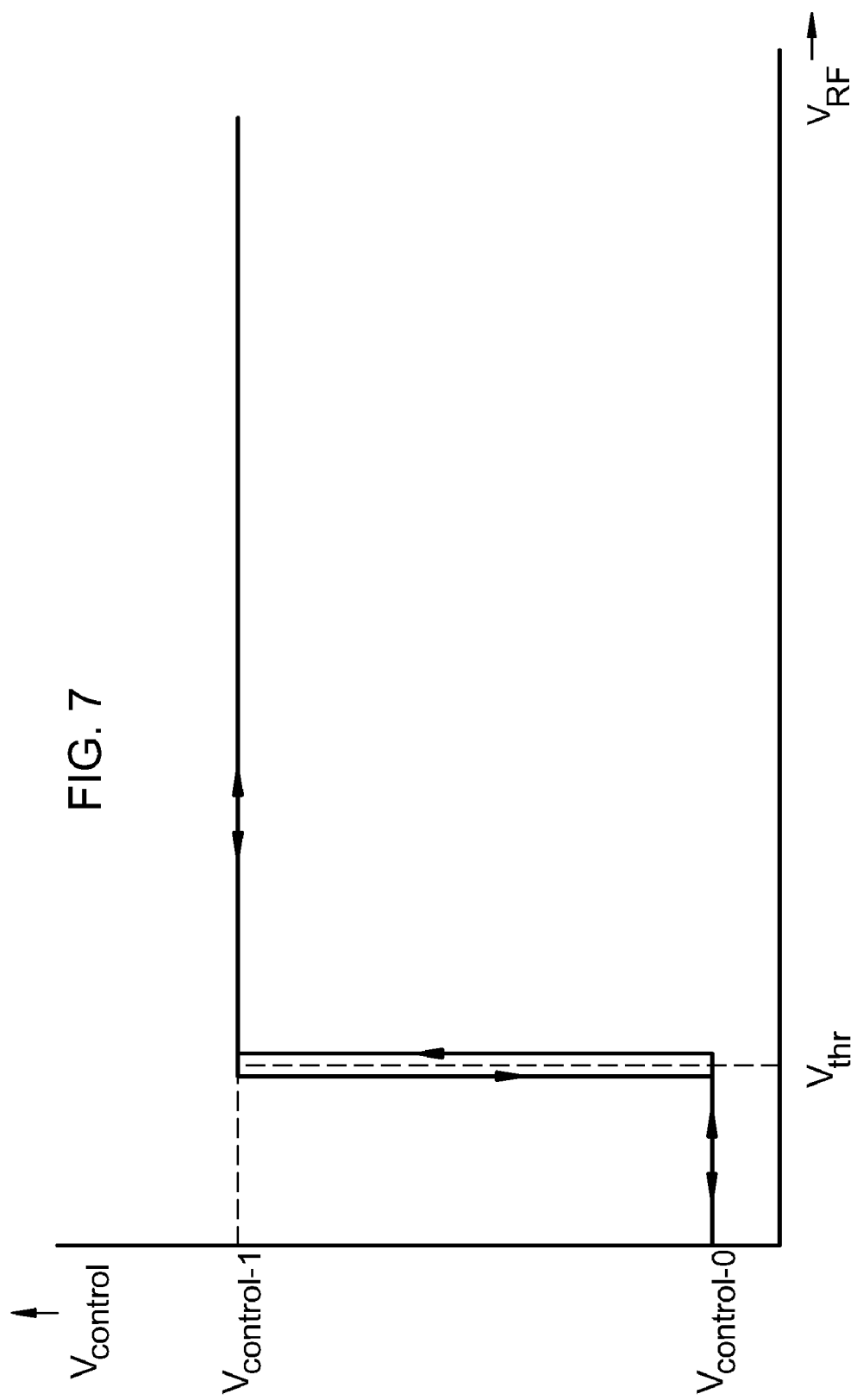
FIG. 7 is a schematic plot of light source control voltage versus RF detector voltage for the exemplary circuit of FIG. 5.
Figure 8:
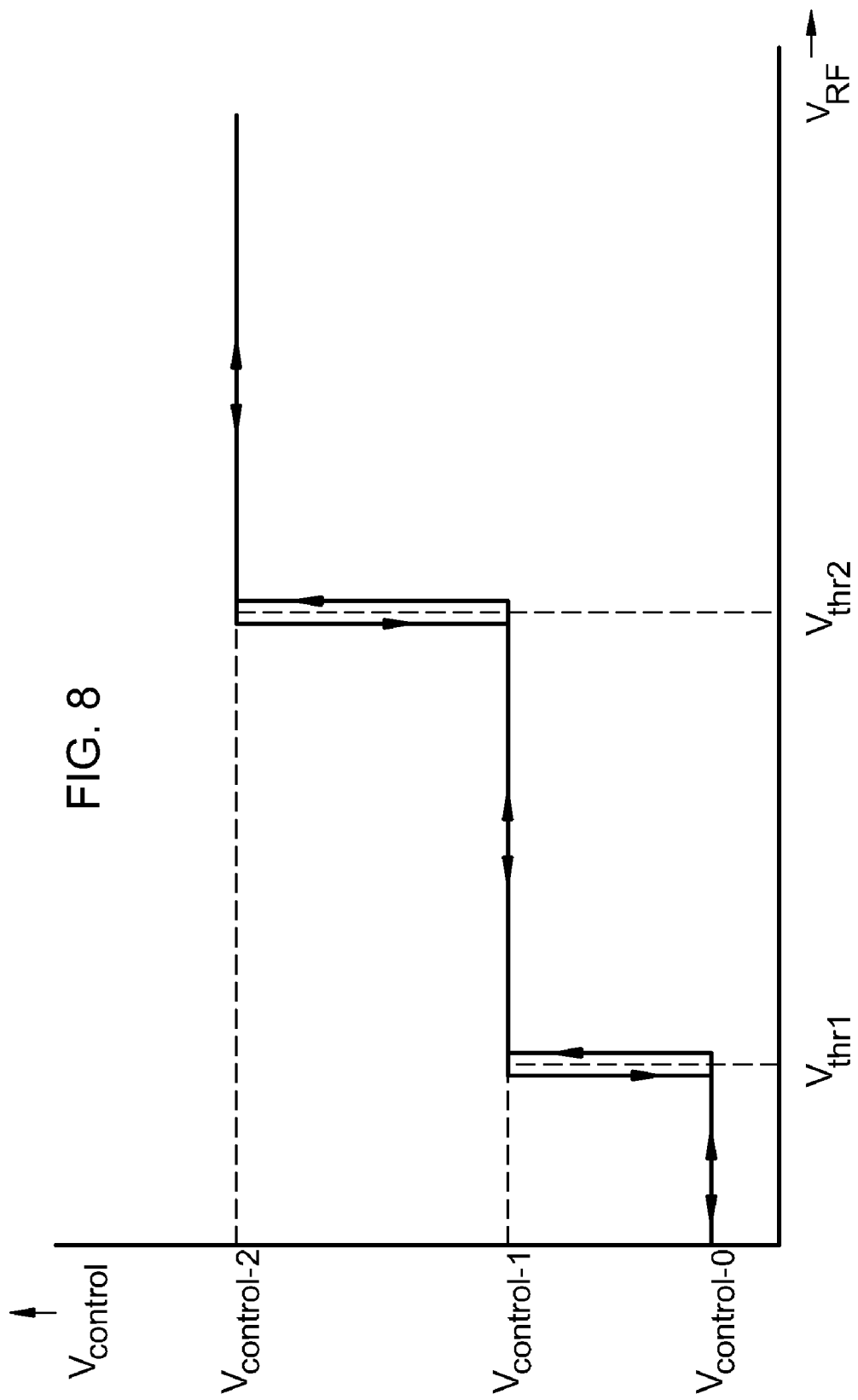
FIG. 8 is a schematic plot of light source control voltage versus RF detector voltage for the exemplary circuit of FIG. 6.

The use of comparators in the exemplary embodiments of FIGS. 5 and 6, in addition to providing the corresponding desired behavior of light source control voltage versus RF signal level illustrated schematically in FIGS. 7 and 8, respectively, can provide other performance advantages over prior light source control circuits employing operational amplifiers (e.g., the embodiment of FIG. 2). For example, when there is little or no RF modulation signal, the constituent operational amplifier(s) of amplifier A1 of FIG. 2 are typically driven to a power supply rail voltage. Upon appearance of an RF modulation signal, there is often a significant time lag (while the operational amplifiers come off of their rail voltages) before the output voltage of amplifier A1 can respond (often on the order of a few microseconds). Such a delay can result in lost data or a disrupted connection in a telecommunications system operating over the passive optical network. A response time of less than a microsecond (μsec) is desirable for a light source operating in a telecommunications system; response times of less than 0.5 μsec, less than 0.1 μsec, less than 0.05 μsec, or less than 0.01 μsec may be desirable. A typical switching time for a comparator is on the order of only a few nanoseconds. In the exemplary circuits of FIGS. 5 and 6, prompt switching of the diode control voltage to a higher, transmitting level reduces the likelihood of data loss or a disrupted connection when an RF modulation signal appears.

Another performance enhancement that arises from use of one or more comparators in the exemplary arrangements of FIGS. 5 and 6 is improved RF electrical isolation between the diode control circuit 502b and the RF detector 510. In the prior exemplary embodiment of FIG. 2, leakage of RF signal and diode-generated distortion through the RF detector 410, through laser power control 408, and into laser current control 402b can result in unacceptably high levels of distortion in the RF-modulated optical signal transmitted by the laser 402a. In the prior embodiment of FIG. 2, optical power control circuit 408 (including amplifier A1) provides little or no RF electrical isolation between laser current control 402b and RF detector 410. Furthermore, providing suitable isolation (typically by low-pass filtering between the RF detector 410 and laser power control 408) often requires a tradeoff between suppressing distortion and achieving sufficiently rapid turn-on time for the modulated laser. In contrast, in the embodiments of FIGS. 5 and 6, optical power control circuit 508 (including comparators CMP1 or CMP2) substantially eliminates leakage of high-frequency electrical signals between RF detector 510 and diode current control 502b. One comparator employed (LM311) has exhibited about 48 dB of isolation between the RF detector and the diode current control. About 35 dB of isolation may be adequate in many circumstances under typical industry specifications or standards. Any other suitable degree of isolation (e.g., 45 dB, 40 dB, 30 dB, 25 dB, 20 dB, and so on) can be employed to reduce distortion of the RF-modulated optical signal emitted by diode 502a to below an acceptable level in a given operational setting or under an applicable specification or standard (i.e., to substantially prevent transmission of RF or transient electrical signals through the RF detector and the optical power control circuit into the diode current control).

Functions of network 506e can include (i) providing suitable impedance matching or gain between a source of the RF signal and the diode 502a, and (ii) combining the RF modulation signal with the stepped, (nominally) DC diode current provided by optical power control circuit 508 and diode current control 502b. For example, one typical source of the RF signal is standard 75 ohm coaxial cable, while diode 502a typically exhibits impedance of about 5-20 ohms (which can vary with bias voltage, diode temperature, or from diode to diode; any suitable impedance value falls within the scope of the present disclosure). Some passive circuits arranged for combining the RF modulation signal with the DC diode current (e.g., a transformer-based circuit) may require limitation of the speed at which diode current control 508 can switch the DC diode current between its idle and transmitting levels (as described above), in order to reduce or avoid detrimental loading or feedback effects that can arise due to undesirable leakage of electrical signals between the RF source and diode current control 502*b*.

Such speed limitations and detrimental effects can be reduced or eliminated by suitable configuration of network 506 for coupling the RF electrical signal to the diode 502*a*. In the exemplary network 506 illustrated schematically in FIG. 9, an impedance Z can be provided by any one or more suitably chosen components to match the impedance of the RF electrical signal source. A single 75 ohm resistor can be sufficient in many instances wherein the RF signal is transmitted via standard 75 ohm coaxial cable. Other components or networks providing any suitable impedance value can be employed. A transimpedance amplifier TIA1 receives the RF signal and is arranged to provide low input impedance. The output of amplifier TIA1 can be further amplified by amplifier A2, which in turn provides an input to a voltage-controlled current source 906. The current output of current source 906 typically comprises the collector of a transistor and therefore exhibits high output impedance. As shown in FIGS. 5 and 6, the diode current source also comprises the collector of a transistor, and therefore also exhibits high output impedance. As a result, the current output of both network 506 and diode current control 502*b* can be readily combined without undesirable loading effects on one another and without the need for any speed (i.e., bandwidth) limitations to avoid loading or feedback effects.

In addition, the arrangement of current source 906 (with a collector of a transistor acting as a current source) results in substantial suppression of reverse transmission of high frequency transient signals arising from diode current control 502*b* into RF detector 510 or into the RF signal source. Such reverse transmission can cause undesirable positive feedback or oscillations in the output of optical power control circuit 508. In prior, passive RF coupling arrangements, suppression of such reverse transmission often requires measures (such as low-pass filtering) that limit the speed of switching the light source between its idle and transmitting states, forcing a tradeoff between switching speed and suppression of feedback or oscillations.

Figure 9:
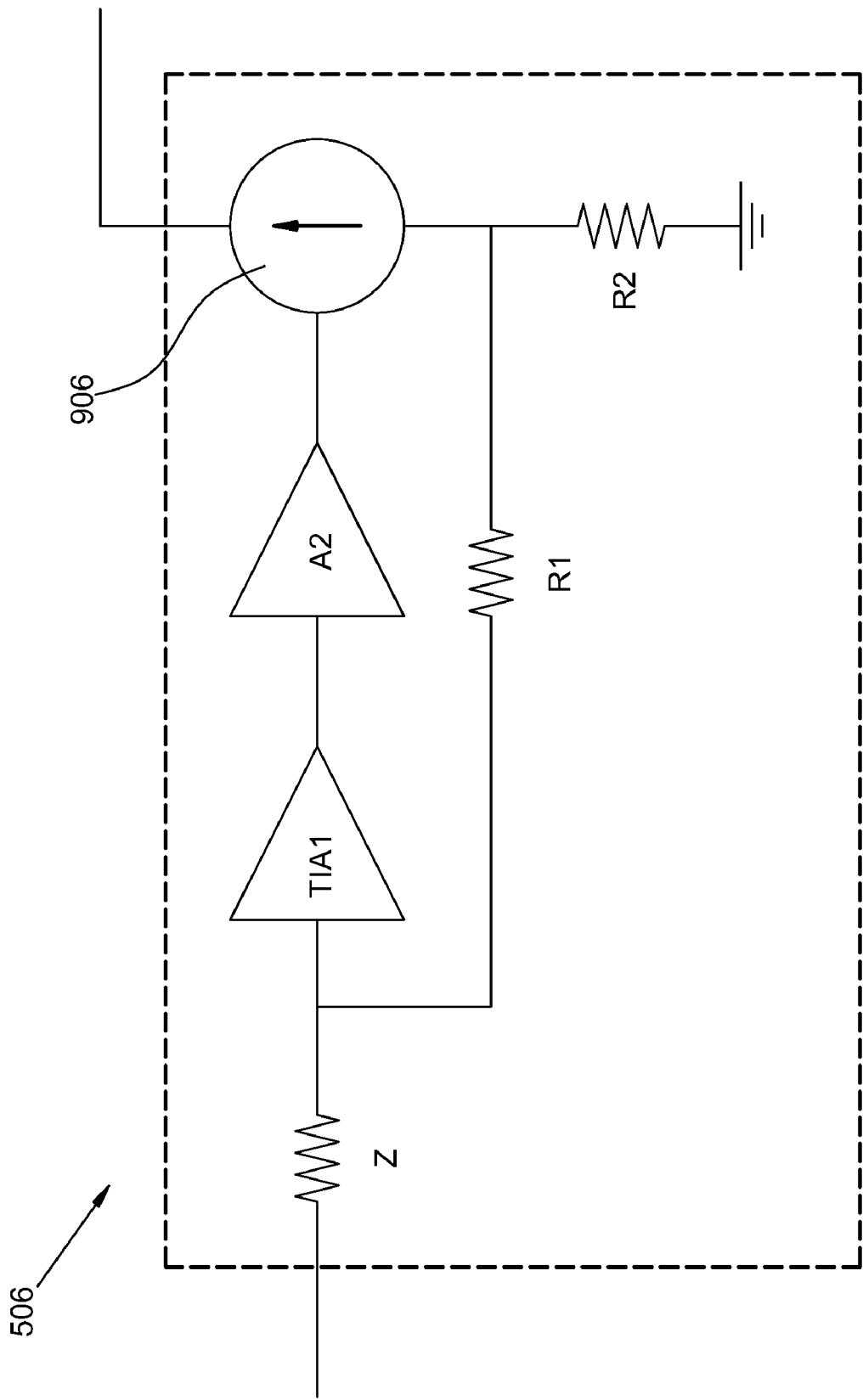
FIG. 9 is a schematic diagram of an exemplary circuit for connecting an RF signal source to a light source.

Generally, RF coupling network 506 comprises (in addition to input impedance Z) a low-impedance RF input stage coupled to drive a voltage-dependent current source 906 with high output impedance. The RF input stage can be coupled to the current source 906 via an intermediate amplifier A2 (if needed or desired), and the output of current source 906 is connected to drive diode 502*a*. Feedback between the RF input and the current source 906 (using resistors R1 and R2 in this example) results in (i) overall input impedance of network 506 substantially equal to the impedance Z, (ii) driving current modulation of diode 502*a* with negligible impedance loading of the RF signal input, (iii) a diode modulation current source that can be combined with another current source (e.g., diode current control 502*b*) without detrimental loading or reverse transmission from one into the other, and (iv) gain of the diode modulation current relative to the RF signal current, which gain is adjustable by selection of suitable resistors R1 and R2. Similar benefits could be realized using a single-transistor, common-base arrangement for coupling the RF modulation signal to diode 502*a*. However, such an arrangement typically exhibits substantial distortion arising from current-dependent resistance variations of the emitter-base junction, unless large bias currents are used. The common-base arrangement also lacks current gain and typically must include some additional gain means (e.g., a transformer) prior to the input if such gain is desired. The illustrated feedback arrangement reduces such distortion without requiring large bias currents. FIG. 9 illustrates one arrangement of network 506 that can exhibit the desirable performance characteristics described above. Other functionally equivalent arrangements can be implemented and shall fall within the scope of the present disclosure or appended claims.

The exemplary apparatus and methods disclosed herein can be employed in passive optical networks carrying analog RF signals, digital RF signals, or RF signals in both formats, and may be of particular utility in passive optical networks transmitting analog RF signals. It is intended that equivalents of the disclosed exemplary embodiments and methods shall fall within the scope of the present disclosure and/or appended claims. It is intended that the disclosed exemplary embodiments and methods, and equivalents thereof, may be modified while remaining within the scope of the present disclosure or appended claims.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or", "only one of . . . ", or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising", "including", "having", and variants thereof shall be construed as open ended terminology, with the same meaning as if the phrase "at least" were appended after each instance thereof. It is intended that the provisions of 35 USC §112 ¶ 6 be invoked only by those claims that include the phrases "means for" or "step for."

What is claimed is:

1. An optical apparatus comprising:
    a light source;
    an RF detector connected and arranged to receive a first fraction of an RF electrical input signal and to provide a corresponding detected RF signal level;
    an optical power control circuit operatively coupled to the RF detector and to the light source and arranged to set a DC optical power level (i) at a first, selected, substantially constant DC optical power level whenever, during operation of the optical power control circuit, the detected RF signal level is below a first selected RF threshold level and (ii) at a second, selected, substantially constant DC optical power level whenever, during operation of the optical power control circuit, the detected RF signal is above the first selected RF threshold level, which second selected DC optical power level is larger than the first selected DC optical power level; and
    an optical modulator operatively coupled to the light source and arranged to receive a second fraction of the RF electrical input signal and to modulate therewith optical output power about the DC optical power level.

2. The apparatus of claim 1 wherein the detected RF signal level is detected RF signal amplitude or detected RF signal power.

3. The apparatus of claim 1 wherein the second selected DC optical power level is sufficiently large so that distortion or clipping of the modulation of the optical output power is substantially avoided.

4. The apparatus of claim 1 wherein:
the light source comprises a diode and a diode current control arranged and connected to supply a diode current to the diode; and
the optical modulator comprises an electrical network connected to couple the received fraction connection of the received RF electrical input signal to the diode.

5. The apparatus of claim 4 wherein the electrical network (i) provides impedance matching between the diode and a source of the RF electrical input signal, (ii) comprises a transimpedance amplifier coupled to a voltage-controlled current source, and (iii) substantially prevents reverse transmission of RF or transient electrical signals from the diode current control to the RF detector or the RF electrical input signal source.

6. An optical apparatus comprising:
a light source;
an RF detector connected and arranged to receive a first fraction of an RF electrical input signal and to provide a corresponding detected RF signal level;
an optical power control circuit operatively coupled to the RF detector and to the light source and arranged to set a DC optical power level (i) at a first selected DC optical power level when the detected RF signal level is below a first selected RF threshold level and (ii) at a second selected DC optical power level when the detected RF signal is above the first selected RF threshold level, which second selected DC optical power level is larger than the first selected DC optical power level; and
an optical modulator operatively coupled to the light source and arranged to receive a second fraction of the RF electrical input signal and to modulate therewith optical output power about the DC optical power level,
wherein the optical power control circuit is arranged to switch from the first to the second selected DC optical power level less than about one microsecond after an increasing detected RF signal level crosses the first selected RF threshold level.

7. An optical apparatus comprising:
a light source;
an RF detector connected and arranged to receive a first fraction of an RF electrical input signal and to provide a corresponding detected RF signal level;
an optical power control circuit operatively coupled to the RF detector and to the light source and arranged to set a DC optical power level (i) at a first selected DC optical power level when the detected RF signal level is below a first selected RF threshold level and (ii) at a second selected DC optical power level when the detected RF signal is above the first selected RF threshold level, which second selected DC optical power level is larger than the first selected DC optical power level; and
an optical modulator operatively coupled to the light source and arranged to receive a second fraction of the RF electrical input signal and to modulate therewith optical output power about the DC optical power level, wherein:
the light source comprises a diode and a diode current control arranged and connected to supply a diode current so that the DC optical power level varies with an applied diode control voltage; and
the optical power control circuit comprises a comparator arranged and connected (i) to compare an RF detector voltage corresponding to the detected RF signal level with a first threshold voltage that corresponds to the first selected RF threshold level, (ii) to apply a first diode control voltage to the diode current control that results in the first selected DC optical power level, if the RF detector voltage is less than the first threshold voltage, and (iii) to apply a second diode control voltage to the diode current control that results in the second selected DC optical power level, if the RF detector voltage is greater than the first threshold voltage.

8. The apparatus of claim 7 wherein the optical power control circuit is arranged to substantially prevent transmission of RF or transient electrical signals through the RF detector and the optical power control circuit into the diode current control.

9. The apparatus of claim 7 wherein the optical power control circuit is arranged to provide at least about 35 dB of isolation of RF and transient electrical signals between the RF detector and the diode current control.

10. An optical apparatus comprising:
a light source;
an RF detector connected and arranged to receive a first fraction of an RF electrical input signal and to provide a corresponding detected RF signal level;
an optical power control circuit operatively coupled to the RF detector and to the light source and arranged to set a DC optical power level (i) at a first selected DC optical power level when the detected RF signal level is below a first selected RF threshold level and (ii) at a second selected DC optical power level when the detected RF signal is above the first selected RF threshold level, which second selected DC optical power level is larger than the first selected DC optical power level; and
an optical modulator operatively coupled to the light source and arranged to receive a second fraction of the RF electrical input signal and to modulate therewith optical output power about the DC optical power level,
wherein the optical power control circuit is further arranged to set the DC optical power level (i) at the second selected DC optical power level when the detected RF signal level is above the first selected RF threshold level and below a second selected RF threshold level and (ii) at a third selected DC optical power level when the detected RF signal level is above the second selected RF threshold level, wherein the second selected RF threshold level is larger than the first selected RF threshold level and the second selected DC optical power level is larger than the first selected DC optical power level.

11. The apparatus of claim 10 wherein the second selected DC optical power level is sufficiently large so that distortion or clipping of the modulation of the optical output power is substantially avoided when the detected RF signal level is between the first and second selected RF threshold levels, and the third selected DC optical power level is sufficiently large so that distortion or clipping of the modulation of the optical output power is substantially avoided when the detected RF signal level is larger than the second selected RF threshold level.

12. The apparatus of claim 10 wherein:
the light source comprises a diode and a diode current control that supplies a diode current so that the DC optical power level varies with an applied diode control voltage; and
the optical power control circuit comprises multiple comparators collectively arranged and connected (i) to compare an RF detector voltage corresponding to the detected RF signal level with a first threshold voltage that corresponds to the first selected RF threshold level, (ii) to compare the RF detector voltage a second threshold voltage that corresponds to the second selected RF threshold level, (iii) to apply a first diode control voltage to the diode current control that results in the first selected DC optical power level, if the RF detector voltage is less than the first threshold voltage, (iv) to apply a second diode control voltage to the diode current control that results in the second selected DC optical power level, if the RF detector voltage is between the first and second threshold voltages, and (v) to apply a third diode control voltage to the diode current control that results in the third selected DC optical power level, if the RF detector voltage is greater than the second threshold voltage.

13. A method comprising:

receiving an RF electrical input signal;

providing a detected RF signal level corresponding to a detected first fraction of the RF electrical input signal;

setting a DC optical power level of a light source (i) at a first, selected, substantially constant DC optical power level whenever, during operation of the light source, the detected RF signal level is below a first selected RF threshold level and (ii) at a second, selected, substantially constant DC optical power level whenever, during operation of the light source, the detected RF signal is above the first selected RF threshold level, which second selected DC optical power level is larger than the first selected DC optical power level; and modulating with a second fraction of the RF electrical input signal output power of the light source about the DC optical power level.

14. The method of claim 13 wherein the detected RF signal level is detected RF signal amplitude or detected RF signal power.

15. The method of claim 13 wherein the second selected DC optical power level is sufficiently large so that distortion or clipping of the modulation of the optical output power is substantially avoided.

16. The method of claim 13 wherein:

the light source comprises a diode and a diode current control that supplies a diode current to the diode; and the optical modulator comprises an electrical network connected to couple the received fraction connection of the received RF electrical input signal to the diode.

17. The method of claim 16 wherein the electrical network (i) provides impedance matching between the diode and a source of the RF electrical input signal, (ii) comprises a transimpedance amplifier coupled to a voltage-controlled current source, and (iii) substantially prevents reverse transmission of RF or transient electrical signals from the diode current control to the RF detector or the RF electrical input signal source.

18. A method comprising:

receiving an RF electrical input signal;

providing a detected RF signal level corresponding to a detected first fraction of the RF electrical input signal;

setting a DC optical power level of a light source (i) at a first selected DC optical power level when the detected RF signal level is below a first selected RF threshold level and (ii) at a second selected DC optical power level when the detected RF signal is above the first selected RF threshold level, which second selected DC optical power level is larger than the first selected DC optical power level;

modulating with a second fraction of the RF electrical input signal output power of the light source about the DC optical power level; and switching the light source from the first to the second selected DC optical power level less than about one microsecond after an increasing detected RF signal level crosses the first selected RF threshold level.

19. A method comprising:

receiving an RF electrical input signal;

providing a detected RF signal level corresponding to a detected first fraction of the RF electrical input signal;

setting a DC optical power level of a light source (i) at a first selected DC optical power level when the detected RF signal level is below a first selected RF threshold level and (ii) at a second selected DC optical power level when the detected RF signal is above the first selected RF threshold level, which second selected DC optical power level is larger than the first selected DC optical power level; and modulating with a second fraction of the RF electrical input signal output power of the light source about the DC optical power level, wherein:

the light source comprises a diode and a diode current control that supplies a diode current so that the DC optical power level varies with an applied diode control voltage; and the optical power control circuit comprises a comparator arranged and connected (i) to compare an RF detector voltage corresponding to the detected RF signal level with a first threshold voltage that corresponds to the first selected RF threshold level, (ii) to apply a first diode control voltage to the diode current control that results in the first selected DC optical power level, if the RF detector voltage is less than the first threshold voltage, and (iii) to apply a second diode control voltage to the diode current control that results in the second selected DC optical power level, if the RF detector voltage is greater than the first threshold voltage.

20. The method of claim 19 wherein the optical power control circuit is arranged to substantially prevent transmission of RF or transient electrical signals through the RF detector and the optical power control circuit into the diode current control.

21. The method of claim 19 wherein the optical power control circuit is arranged to provide at least about 35 dB of isolation of RF and transient electrical signals between the RF detector and the diode current control.

22. A method comprising:

receiving an RF electrical input signal;

providing a detected RF signal level corresponding to a detected first fraction of the RF electrical input signal;

setting a DC optical power level of a light source (i) at a first selected DC optical power level when the detected RF signal level is below a first selected RF threshold level and (ii) at a second selected DC optical power level when the detected RF signal is above the first selected RF threshold level, which second selected DC optical power level is larger than the first selected DC optical power level;

modulating with a second fraction of the RF electrical input signal output power of the light source about the DC optical power level; and setting the DC optical power level (i) at the second selected DC optical power level when the detected RF signal level is above the first selected RF threshold level and below a second selected RF threshold level and (ii) at a third selected DC optical power level when the detected RF signal level is above the second selected RF threshold level, wherein the second selected RF threshold level is larger than the first selected RF threshold level and the second selected DC optical power level is larger than the first selected DC optical power level.

23. The method of claim 22 wherein the second selected DC optical power level is sufficiently large so that distortion or clipping of the modulation of the optical output power is substantially avoided when the detected RF signal level is between the first and second selected RF threshold levels, and the third selected DC optical power level is sufficiently large so that distortion or clipping of the modulation of the optical output power is substantially avoided when the detected RF signal level is larger than the second selected RF threshold level.

24. The method of claim 22 wherein:
the light source comprises a diode and a diode current control that supplies a diode current so that the DC optical power level varies with an applied diode control voltage; and
the optical power control circuit comprises multiple comparators collectively arranged and connected (i) to compare an RF detector voltage corresponding to the detected RF signal level with a first threshold voltage that corresponds to the first selected RF threshold level, (ii) to compare the RF detector voltage a second threshold voltage that corresponds to the second selected RF threshold level, (iii) to apply a first diode control voltage to the diode current control that results in the first selected DC optical power level, if the RF detector voltage is less than the first threshold voltage, (iv) to apply a second diode control voltage to the diode current control that results in the second selected DC optical power level, if the RF detector voltage is between the first and second threshold voltages, and (v) to apply a third diode control voltage to the diode current control that results in the third selected DC optical power level, if the RF detector voltage is greater than the second threshold voltage.

25. An optical apparatus, comprising:
a light source;
means for receiving a first fraction of an RF electrical input signal and for providing a corresponding detected RF signal level;
means for setting a DC optical power level (i) at a first, selected, substantially constant DC optical power level whenever, during operation of the DC optical power setting means, the detected RF signal level is below a first selected RF threshold level, and (ii) at a second, selected, substantially constant DC optical power level whenever, during operation of the DC optical power setting means, the detected RF signal is above the first selected RF threshold level; and
means for receiving a second fraction of the RF electrical input signal and for modulating therewith output power of the light source about the DC optical power level.

26. An optical apparatus, comprising:
a light source;
means for receiving a first fraction of an RF electrical input signal and for providing a corresponding detected RF signal level;
means for setting a DC optical power level (i) at a first selected DC optical power level when the detected RF signal level is below a first selected RF threshold level, and (ii) at a second selected DC optical power level when the detected RF signal is above the first selected RF threshold level; and
means for receiving a second fraction of the RF electrical input signal and for modulating therewith output power of the light source about the DC optical power level; and
means for setting the DC optical power level (i) at the second selected DC optical power level when the detected RF signal level is above the first selected RF threshold level and below a second selected RF threshold level and (ii) at a third selected DC optical power level when the detected RF signal is above the second selected RF threshold level, wherein the second selected RF threshold level is larger than the first selected RF threshold level and the second selected DC optical power level is larger than the first selected DC optical power level.

* * * * *